United States Patent [19]

Walker

[11] Patent Number: 6,104,837
[45] Date of Patent: Aug. 15, 2000

[54] IMAGE DATA COMPRESSION FOR INTERACTIVE APPLICATIONS

[75] Inventor: David P. Walker, Redhill, United Kingdom

[73] Assignee: U.S. Philis Corporation, New York, N.Y.

[21] Appl. No.: 08/880,038

[22] Filed: Jun. 20, 1997

[30] Foreign Application Priority Data

Jun. 21, 1996 [GB] United Kingdom ............ 9613039

[51] Int. Cl.[7] ..................... G06T 9/00
[52] U.S. Cl. ............ 382/239; 382/251; 345/421
[58] Field of Search ................ 382/166, 239, 382/232, 237, 113, 106, 251, 154; 345/421, 422

[56] References Cited

U.S. PATENT DOCUMENTS

| | | | |
|---|---|---|---|
| 5,222,154 | 6/1993 | Graham et al. | 382/162 |
| 5,325,124 | 6/1994 | Keith | 348/391 |
| 5,463,702 | 10/1995 | Trueblood | 382/239 |
| 5,487,019 | 1/1996 | Ueta et al. | 364/514 R |
| 5,784,064 | 7/1998 | Penna et al. | 345/422 |
| 5,808,618 | 9/1998 | Kawano et al. | 345/422 |
| 5,819,017 | 10/1998 | Akeley et al. | 710/8 |
| 5,892,847 | 4/1999 | Johnson | 382/232 |
| 5,978,502 | 11/1999 | Ohashi | 382/147 |

FOREIGN PATENT DOCUMENTS

0634733 A2  1/1995  European Pat. Off. ........ G06T 15/70

*Primary Examiner*—Jon Chang
*Attorney, Agent, or Firm*—Gregory L. Thorne

[57] ABSTRACT

A compression method and apparatus are provided for use in image data processing where two-dimensional pixel images have respective absolute depth values specified per pixel, and that depth data is required to be compressed prior to transmission or storage with the image data. The process of compressing the depth data per image begins by determining patches of adjoining pixels of the image (90), which pixels of a patch have the same or similar depth values, and assigning a common depth value to all pixels of the patch. Next, pixel patches having the same or similar common pixel depth values are grouped together (92), and a common depth value is assigned to all pixels of the patches so grouped, following which for each discrete pixel depth value, a determination is made (94) as to the area or number of pixels of the image having that depth value. For the smallest of these areas, the depth value of each of those pixels concerned is modified (100) to the nearest existing discrete depth value. The determination of smallest area and consequent reassignment of depth value is then repeated until only a predetermined number N (for example 16 or 32) of discrete depth values remain. The reassignment of depth values with reference to the depths of adjoining pixels means that the depth data reduced to the N discrete levels may then be run-length coded to achieve a substantial reduction in depth data volume.

15 Claims, 6 Drawing Sheets

IMAGE DATA COMPRESSION FOR INTERACTIVE APPLICATIONS

BACKGROUND OF THE INVENTION

The present invention relates to a method and apparatus for processing image data, and in particular pixel depth data accompanying a video or graphics image, for use where two or more such images are to be combined with preferential contributions being taken from one or another of the images in dependence on their respective depths.

BACKGROUND ART

Such an apparatus for mixing of contributions from two or more image planes is described in the commonly assigned European patent application EPA-0,634,733. In that application, a method and apparatus for image processing are provided in which two or three planar images form the component material with each of the images having a respective absolute depth value defined for substantially all of the pixels. In the combination, the respective depth values of corresponding pixels in at least the first and second images are compared, with preferential contributions being obtained from the front-most pixels of either the first or second image in dependence on their respective depth values. Where a third image is provided, suitably as "background" but also with individually specified absolute depth values, the per-pixel comparison is simply extended to determine the front-most of three values, thus enabling sprites modelled in either the first or second plane to apparently pass behind features of the third plane. Where opacity values are available to describe image pixels, the three value comparison may provide a preliminary stage to determining the per-image contribution to each pixel.

Such an arrangement of overlaid two-dimensional planes wherein the depth sorting for image features is done on a per-pixel rather than a per-plane basis, provides a relatively simple way to provide the appearance of a three-dimensional environment for interactive applications without requiring real-time manipulation of three-dimensional environment image data.

In the system of EP-A-0,634,733, the depth values that accompany each image are compressed, prior to being stored with the video information for that image, and decompressed during playback. The compression may be effected by a process of quantisation and run-length encoding but we have found that this alone is an unsatisfactory way to reduce the volume of depth data for some applications. For instance, with an image frame of 352 by 176 pixels having the depth data specified in 24 bits per pixel, approximately 250 Kbytes of memory would be required for depth data storage: however, for real-time transmission of the image data, this volume of accompanying depth data needs typically to be reduced to 2 Kbytes. Applying a coarse quantisation of the data values, such as to result in large areas of the image having common depth values (thereby facilitating run-length coding of the depth data) can achieve such a reduction but at the expense of ignoring the possibility that areas of the image require less detailed depth specification than others and thus permitting inefficient utilisation of the available bit-volume.

BRIEF SUMMARY OF THE INVENTION

It is accordingly an object of the present invention to provide means for reducing the volume of depth data required to accompany an image.

It is a further object of the present invention to reduce the volume of data in such a way as to take account of the image content as well as depth data distribution.

In accordance with the present invention there is provided a method of image data processing wherein a two-dimensional pixel image is provided, with a respective absolute depth value being specified per pixel, and said depth data is compressed prior to transmission or storage with the image data, characterised in that the process of compressing the depth data per image comprises, in sequence, the steps of:

a) determining patches of adjoining pixels of the image, which pixels of a patch have the same or similar depth values to within a first predetermined range, and assigning a first common depth value to all pixels of the patch;

b) grouping pixel patches having the same or similar common pixel depth values to within a second predetermined range, and assigning a second common depth value to all pixels of patches so grouped;

c) for each discrete pixel depth value, determining the number of pixels of the image having that depth value and, for the smallest number of pixels, reassigning the depth value of each of those pixels to the nearest existing discrete depth value; and d) repeating step c) until only a predetermined number N of discrete depth values remain.

As can be seen, the invention provides a more adaptive technique for reducing the volume of depth data. By first grouping together adjoining pixels of similar depth and subsequently assigning a common depth value to all patches of a similar depth, the effective quantisation is more closely based on the image content, and run-length coding of the data (which may be provided as a further step (e) of the method) will achieve a greater reduction of data than would be the case if, for example, the original depth data was simply quantised to N different but equally spaced values. Prior to the above mentioned step (a), some quantisation may be used if there is an excessively large range of initial depth values, or those depth values are specified to greater accuracy than is required. This initial quantisation might, for example, reduce the depth values to a first number such as 256, with the further compression effected by the method above reducing this to N=16 discrete depth values.

As will be described hereinafter, by way of a further technique for efficient reduction of the data, prior to the above-mentioned step (a), areas of the image might be identified as "excluded" areas, for example where it is known that no depth data will be required: a saving in the volume of depth data, as well as processing time required, may then be effected by performing the above-mentioned steps (a) to (d) only in respect of those parts of the image of interest, that is to say other than the excluded areas.

The present invention also provides image data processing apparatus comprising a first memory arranged to receive and store data defining a two-dimensional pixel image, and data defining a respective absolute depth value per pixel, the apparatus further comprising depth data processing and compression means arranged to process and compress the stored depth data of an image prior to transmission or storage of said depth data with the image data, characterised in that the depth data processing and compression means comprises a first comparison stage arranged to determine patches of adjoining pixels of the image, which pixels of a patch have the same or similar depth values to within a first predetermined range, and to amend the respective stored depth values to a common depth value for all pixels of the patch; a second comparison stage arranged to group pixel patches having the same or similar common pixel depth values to within a second predetermined range, and to amend the respective stored depth values a common depth value for all pixels of patches so grouped; area determination means arranged, for each discrete pixel depth value in the first memory, to determine the area of pixels in the image at that depth value and, for the smallest such area, to amend the respective stored depth value of each pixel of that area to the nearest existing discrete depth value; and counter means arranged to trigger repeated operation of the area determination means until only a predetermined number N of discrete depth values remain in the first memory.

The apparatus may further comprise a first (run-length) encoder, suitably triggered by the counter means determining that the N discrete depth values remain, to generate a run-length coded representation of the depth data in the memory. A second encoder may also be provided, the second encoder being arranged to compress the pixel image data according to a predetermined coding scheme (such as MPEG). An interleaving circuit is suitably then provided to combine the outputs of the first and second encoders (and optionally also data from further data sources) in an output data stream.

With regard to the common depth value imposed on all pixels of a patch (by the first comparison means), this may comprise the largest or the smallest of the unamended depth values for the pixels of that patch, or some intermediate value within the above-mentioned first predetermined range may be chosen. Similarly, the common depth value imposed on groups of patches by the second comparison stage may be the greatest or least of the individual patch depth values, or again some intermediate value (within the above-mentioned second predetermined range) may be imposed.

BRIEF DESCRIPTION OF THE DRAWINGS

Further features and advantages of the present invention will now become apparent from reading of the following description of preferred embodiments of the present invention, given by way of example only, and taken in conjunction with the accompanying drawings, in which.

DETAILED DESCRIPTION OF THE INVENTION

Figure 1:
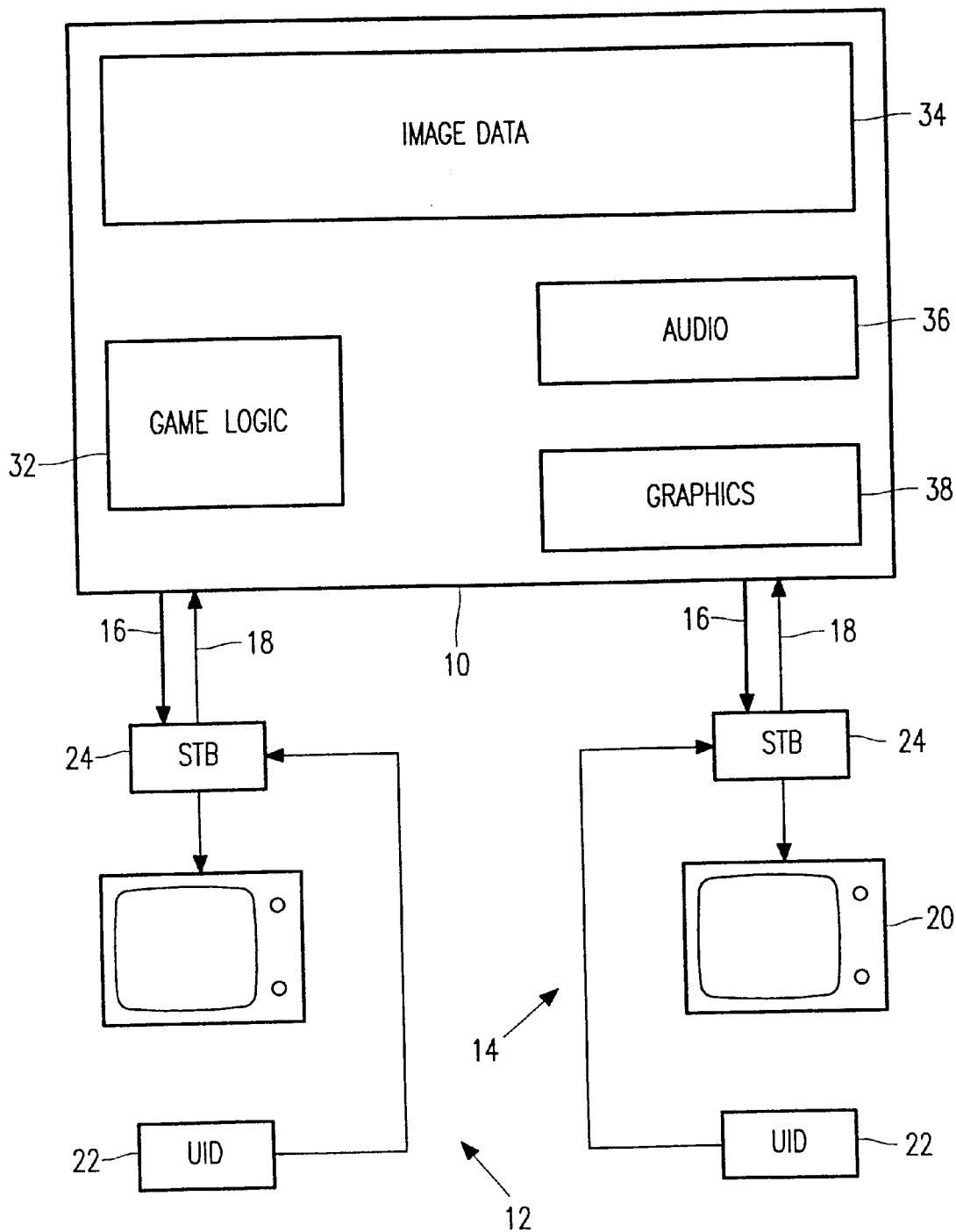
FIG. 1 schematically illustrates a remote multi-user game system, based on a Video-on-Demand server architecture.

FIG. 1 shows an example of a remote multi-player game system for which the compression technique of the invention may suitably be used. A central server 10 sends data out to remote user stations 12,14 over data lines 16, and with communications from the remote users to the server being sent on back-channels 18. Each of the remote user stations 12,14 comprises a display 20 (which might suitably be the user's television set), together with a user input device (UID) 22 and a set-top box (STB) 24 providing local intelligence and interfacing to the connections with the server 10.

Figure 2:
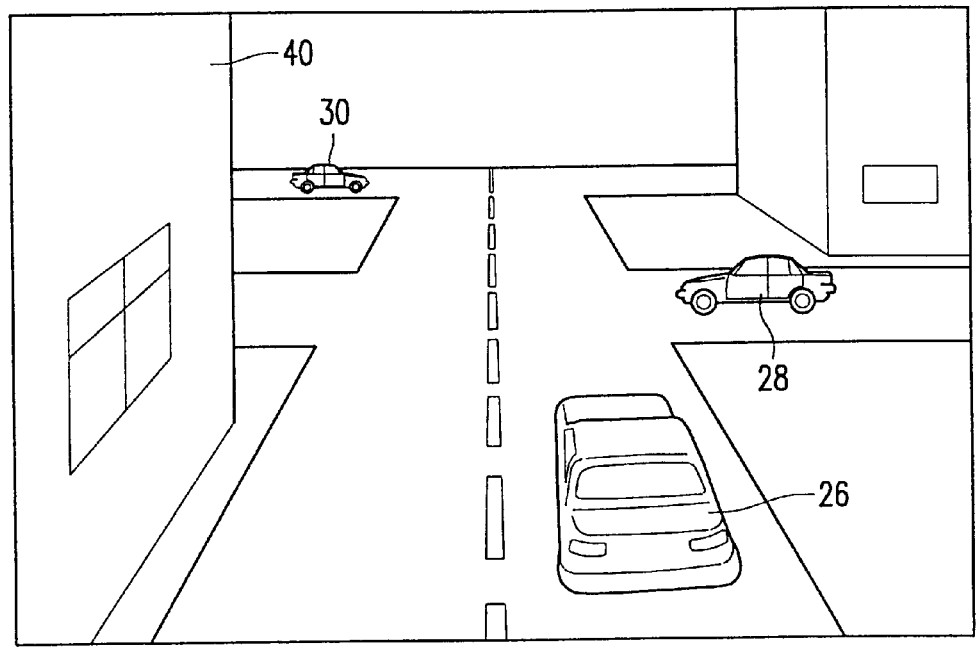
FIG. 2 represents an image presented to a user at a terminal of the game system of FIG. 1.

As shown in FIG. 2, a suitable game playing environment might comprise an urban environment where users drive vehicles 26,28,30 around streets in an attempt, for example, to catch one another. The landscape, comprising roads, buildings, etc is presented to a user STB as an MPEG video stream. Each player controls the movements of his own vehicle 26 through his own STB 24 with the overall control of the game being handled by a game logic section 32 in the server 10. The server has a further area 34 holding the MPEG data for all of the different views of the environment which may be presented to a user in dependence on that user's position within the game environment, their speed of travel, orientation etc. Further server stages handle audio accompaniment 36 for the games and graphics features 38 which may be overlaid by a user's STB on the image stream presented.

Each of the vehicles 26,28,30 is stored in a memory of each STB 24 as a series of images taken from different angles and elevations. When a vehicle is to be displayed, the sprite image with the nearest angle and elevation is selected from amongst those stored, scaled to the correct size, and drawn on the screen. In operation, the server 10 will identify to each user the location of each of the vehicles within the portion of the environment which can be seen by that user. The STB is then responsible for generating the composite image of vehicle sprites overlying the server-supplied video background.

As can be seen from FIG. 2, if either of the vehicles 28 or 30 were to be travelling on the portion of the road at the left-hand side of the image, simply overlying would result in them appearing in front of the building 40, which is clearly unsatisfactory: the system accordingly provides for clipping of the vehicle sprites as they enter areas of the image where they should be obscured.

Figure 3:
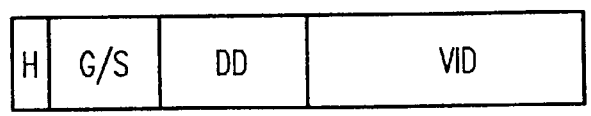
FIG. 3 represents the interleaving of components into an MPEG data stream according to an aspect of the invention.
Figure 4:
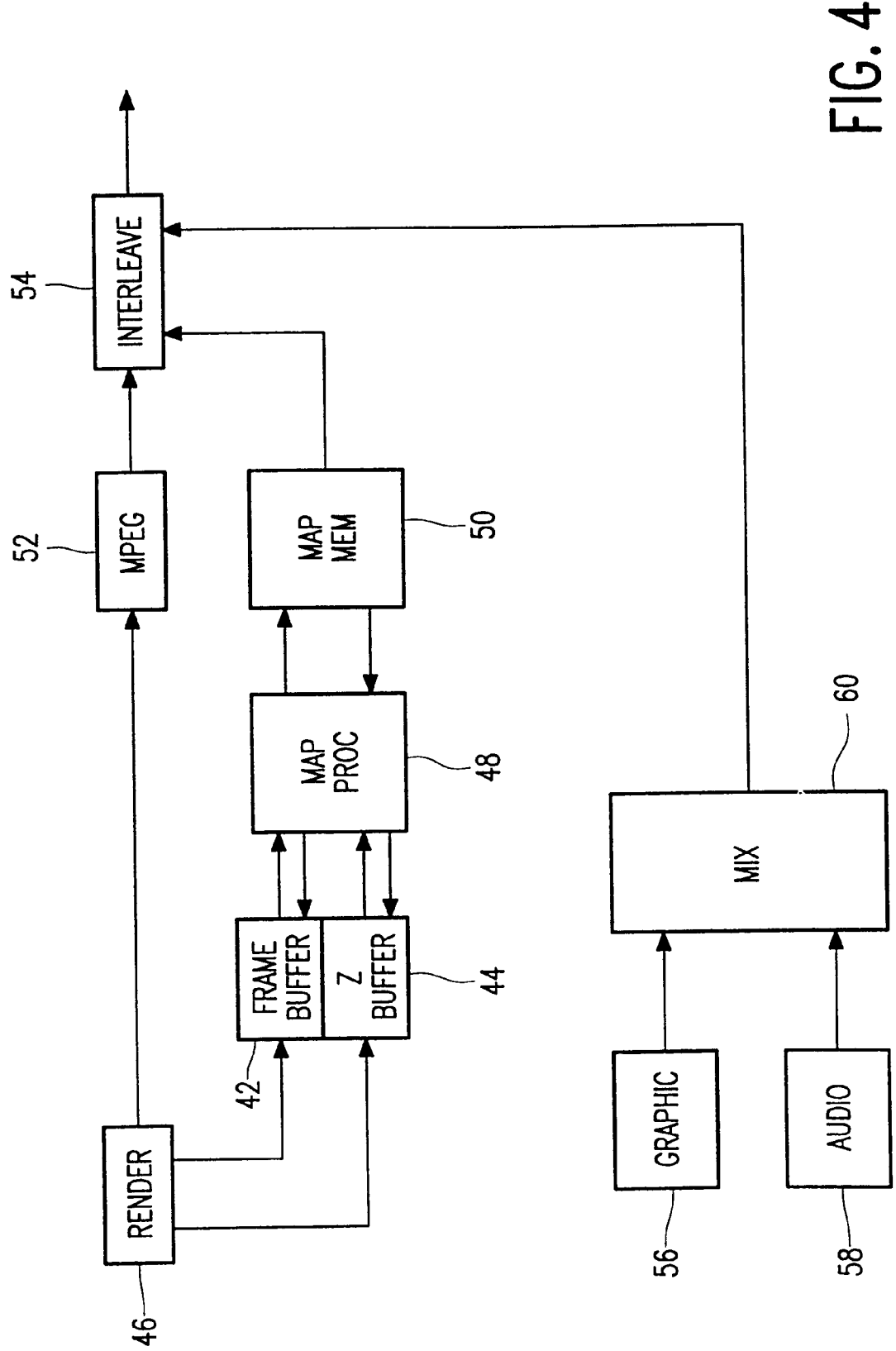
FIG. 4 is a block schematic diagram of an encoder apparatus embodying the present invention.

Turning now to FIGS. 3 and 4, the data transmitted to a user's STB is in the form shown in FIG. 3 which is a frame description delivered as an MPEG2 stream by the server to the STB. The frame comprises a short header portion H followed by portions for the graphics/sound data (G/S), the depth data (DD) and the video image data (VID). As the STB updates its associated display screen thirty times per second, so the game logic 32 and image 34 sections of the server need to deliver the frame description at this rate.

In order to enable the clipping by the STB of sprites at image positions where they ought to be obscured, the depth data DD accompanying each image frame specifies the respective depths of features of that frame such that, by comparison of the respective image and sprite depth values at the point of interest, it can be determined whether the vehicle should simply be drawn on top of the video image or clipped.

FIG. 4 schematically illustrates an encoder apparatus for generating encoded versions of each image frame, to be stored in stage 34 of the server 10 (FIG. 1) together with the respective depth data for the pixels of that image. A frame buffer 42, with associated depth buffer 44, holds the video image data generated by a rendering stage 46 with the depth buffer 44 (z buffer) holding an initial respective depth value for each pixel of the image frame stored in buffer 42. The depth "map" in buffer 44 is processed by map processor 46 to reduce the overall amount of depth data needed to be transmitted per frame, with a map memory 50 maintaining an ongoing record of current depth value per pixel as these are modified by the processor 48, in a manner to be described. The output of the frame buffer 42 is passed to an MPEG encoder stage 52 which applies discrete cosine transform compression to the video image in known manner. The MPEG encoded video is then output to an interleaved stage 54 which suitably also receives inputs from graphics 56 and audio 58 data sources (which may be combined prior to the interleaved stage by mixer circuit 60) with the interleave stage 54 then assembling the MPEG frames as in FIG. 3 and outputting them for transmission over data channels 16 (FIG. 1) or for storage (for example on an optical disc).

As will be readily understood, the MPEG encoding stage 52 may include some re-ordering of images in order to allow for generation of continuous MPEG streams if these are required: this will involve additional buffering to allow for the frame re-ordering as well as further buffering for the respective depth maps such that, in the output frames, the correct depth map accompanies the associated image frame. For other applications, the video images may all be encoded as MPEG l-frames (provided that there is sufficient transmission bandwidth/storage capacity) such that re-ordering is not required.

Figure 5:
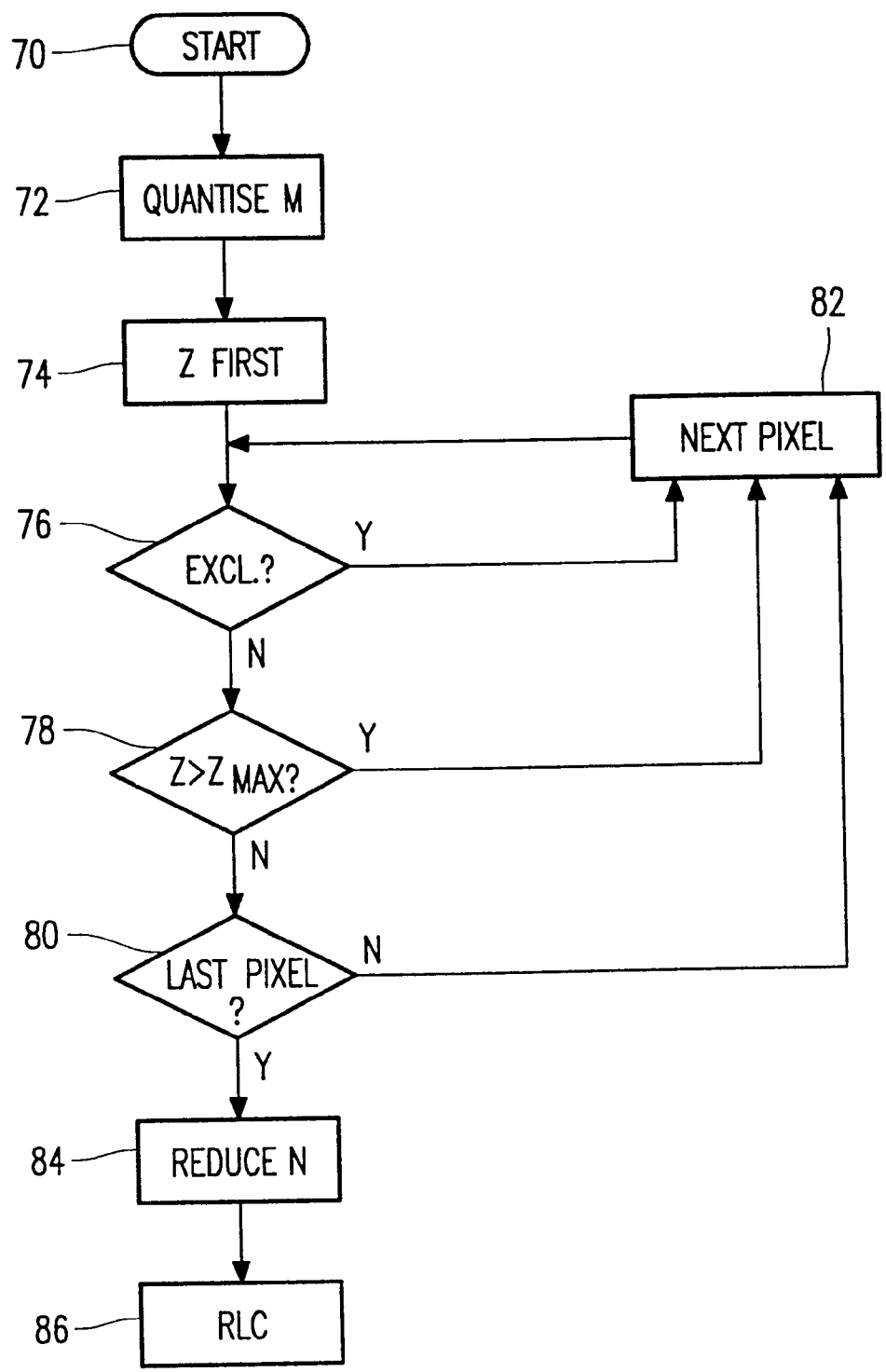
FIG. 5 is a flowchart representing operation of a part of the encoder apparatus of FIG. 4.

The depth map reduction technique implemented by map processor 48 is illustrated by the flow chart of FIG. 5. As will be recognised, although the following describes the processes in terms of software controlled data management processes, the respective process steps shown might equally be implemented in hardware or in a combination of hardware and software. The process starts at step 70 when the complete depth map of an image is available. If this depth map is specified to a very wide range of values, or the data is specified to great detail, the next step 72 is suitably to quantise the depth values to a first number M of discrete depth values: a suitable value for M might, for example, be 256 discrete depth values.

Following quantisation at step 72, the depth data for the first pixel is selected at step 74 following which two different (optional) tests are applied at steps 76 and 78 determining respectively whether the pixel is excluded from consideration (for being in an area of the image where overlapping and clipping will not occur) or whether the pixel has a depth greater than a predetermined threshold value, for example the depth at which any sprite for display will be scaled to a size of less than one pixel. If either steps 76 or 78 hold true, then the pixel in question can be ignored and no depth value will be stored for that particular pixel in the map memory 50 (FIG. 4). Steps 76 and 78 are repeated for each pixel of the image, under control of Last Pixel?/Next Pixel steps 80 and 82 to provide in the map memory 50 a body of valid depth data for an image. This depth data is reduced at step 84 to the point where there are only N discrete depth values remaining in memory 50 (where N might, for example, be 16 or 32) following which, at step 86, the reduced resolution depth map from memory 50 is run-length coded prior to supply to the interleave circuit 54 of FIG. 4.

Figure 6A:
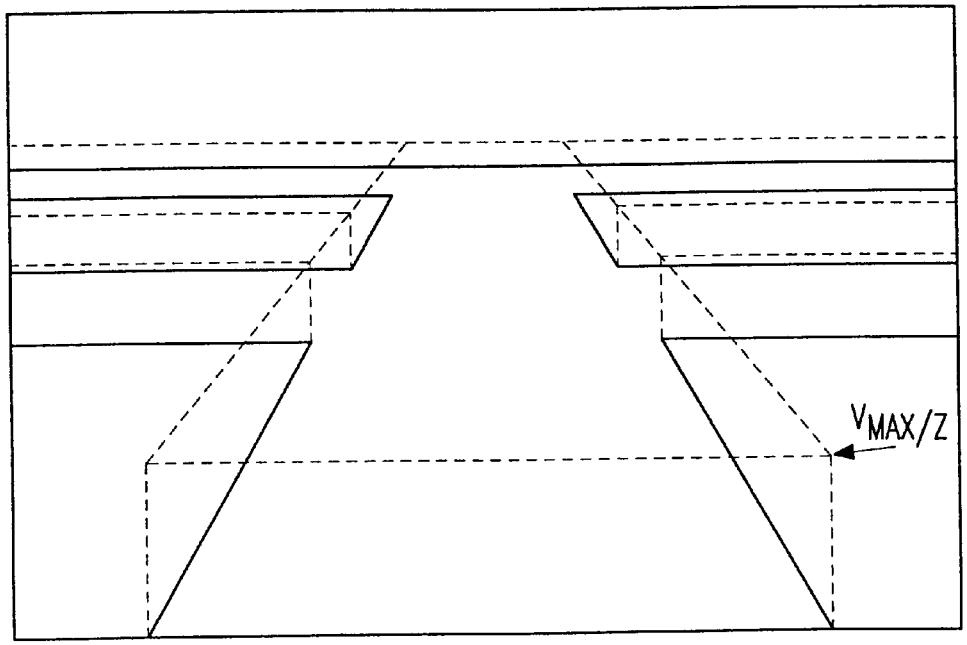
FIGS. 6A and 6B represent steps in the generation of an "exclusion map" for the image of FIG. 2.
Figure 6B:
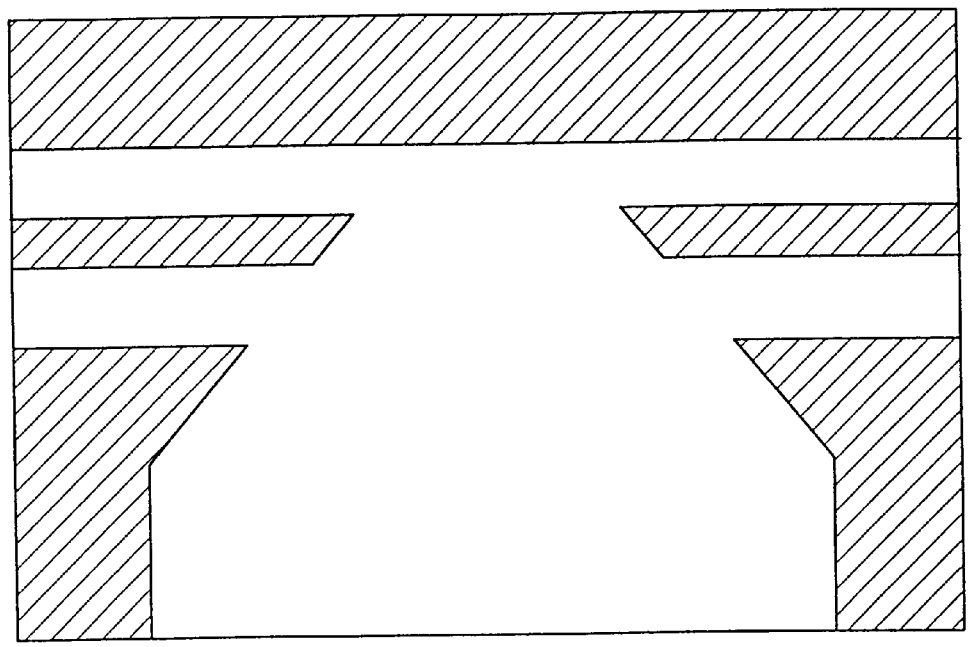

FIGS. 6A and 6B illustrate how the exclusions for step 76 may be calculated. In the example, the roadways of FIG. 2 represent the only area of the image where a moving sprite may appear. In recognising this, an exclusion mask is generated by vertically extruding the roads to the maximum height of a vehicle at the respective depth ($V_{MAX}Z$) as in FIG. 6A. From this extrusion, the exclusion map (of FIG. 6B) is generated: at step 76 in the flow chart of FIG. 5, the map processor simply checks the XY coordinates of the particular pixel under consideration and, if it falls within the excluded area (the hatched portions of FIG. 6B), that pixel is simply ignored and the next pixel is chosen for consideration (return loop via step 82).

Figure 7:
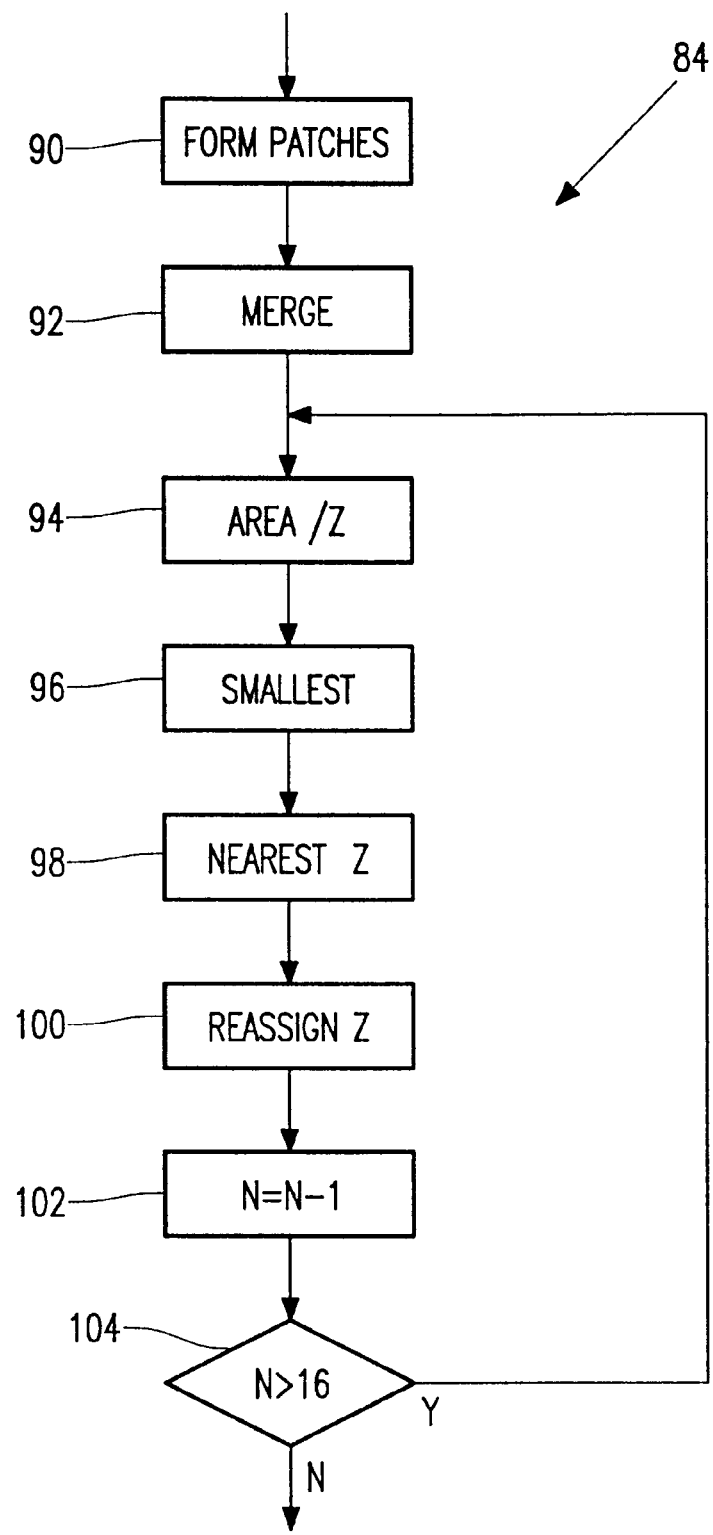
FIG. 7 is a flowchart representing the reduction step of FIG. 5 in greater detail.

The reduction of the number of discrete depth values to N, performed at step 84 of FIG. 5, is shown in greater detail by the flow chart of FIG. 7. The first step 90 of the reduction process is to define patches of adjoining pixels for which all pixels of the patch have the same or similar depth values to within a predetermined range. These patches might be determined by performing a search algorithm repeatedly starting from the next-as-yet-unpatched pixel with the predetermined range governing membership or otherwise of that patch being a set value on either side of the depth value for the first pixel of the patch. However the candidate pixels are selected, on identification as members of a patch, all pixels of the patch have their respective depth values (in map memory 50) amended to a single common depth value.

The next stage, at step 92, is to compare the respective assigned depth values for all of the patches formed by step 90 (which patches may be as small as a single pixel) and, for patches having respective common depth values which are the same or are separated by less than a predetermined amount, all of the pixels in each such grouped patch have their respective depth values in map memory 50 amended to a single common value. The choice of common value applied at steps 90 and 92 may be dependent upon the particular image feature represented by the particular pixels under consideration. For example, in the example of FIG. 2, all of the pixels showing the side of the building 40 will have a common depth value set which is equivalent to the depth of the frontmost pixels of that building image. Conversely, for grouped together pixels representing a part of the road surface, it is the greatest unamended depth per patch which will be applied to avoid the possibility of a vehicle sprite being clipped by the road it is supposed to be appearing upon.

Having formed the patches of common depth value and then merged the similar patches, again to a common depth value, the number of discrete pixel depth values may have reduced substantially, for example from 256 to 40. The remaining reduction steps 94 to 104 then adaptively quantise these remaining 40 discrete depth values in such a way as to maximise the compression resulting from the subsequent run-length coding stage 86 of FIG. 5.

The first step of the adaptive quantisation is to determine, from the data stored in map memory 50, the respective pixel area covered by the pixels at each of the discrete depth values. With the depth data being stored as a map corresponding to the image, this is simply a case of counting the number of pixels per depth value. Following calculation these area values are suitably stored, perhaps in an area of map memory 50, to avoid the need to subsequently re-calculate them as will become apparent.

Having calculated the relative pixel areas per depth value, the smallest area of these is determined at step 96. At step 98, the nearest existing discrete depth value to the depth value for the smallest area determined by step 96 is determined, and at step 100, the stored depth values for each pixel of this smallest patch/group are replaced with the depth value found at step 98. At step 102, a nominal count value for the number of discrete values N is reduced by one following re-assignment of the depth values for the smallest area and, at step 104, a check is made to see whether the desired number of discrete depth values (for example N=16) has been reached. If so, the procedure then moves to the run-length coding stage 86 of FIG. 5: otherwise, the reduction process returns to step 94. As suggested above, rather than step 94 again determining all of the relevant respective pixel areas, the stored area data is suitably recalled and simply amended by adding the previous smallest area to the area at the nearest existing depth as determined at step 98 on the previous loop.

In summary, we have described a compression method and apparatus for use in image data processing where two-dimensional pixel images have respective absolute depth values specified per pixel, and that depth data is required to be compressed prior to transmission or storage with the image data. The process of compressing the depth data per image begins by determining patches of adjoining pixels of the image, which pixels of a patch have the same or similar depth values, and assigning a common depth value to all pixels of the patch. Next, pixel patches having the same or similar common pixel depth values are grouped together, and a common depth value is assigned to all pixels of the patches so grouped, following which for each discrete pixel depth value, a determination is made as to the area or number of pixels of the image having that depth value. For the smallest of these areas, the depth value of each of those pixels concerned is modified to the nearest existing discrete depth value. The determination of smallest area and consequent reassignment of depth value is then repeated until only a predetermined number N (for example 16 or 32) of discrete depth values remain. The reassignment of depth values with reference to the depths of adjoining pixels means that the depth data reduced to the N discrete levels may then be run-length coded to achieve a substantial reduction in depth data volume.

From reading the present disclosure, other modifications will be apparent to persons skilled in the art. Such modifications may involve other features which already known in the field of image data processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of image data processing wherein a two-dimensional pixel image is provided, with a respective absolute depth value being specified per pixel, and said depth data is compressed prior to transmission or storage with the image data, characterised in that the process of compressing the depth data per image comprises in sequence, the steps of:

a) determining patches of adjoining pixels of the image, which pixels of a patch have the same or similar depth values to within a first predetermined range, and assigning a first common depth value to all pixels of the patch;

b) grouping pixel patches having the same or similar common pixel depth values to within a second predetermined range, and assigning a second common depth value to all pixels of patches so grouped;

c) for each discrete pixel depth value, determining the number of pixels of the image having that depth value and, for the smallest number of pixels, reassigning the depth value of each of those pixels to the nearest existing discrete depth value; and d) repeating step c) until only a predetermined number N of discrete depth values remain.

2. A method as claimed in claim 1, comprising the further step, prior to step a), of identifying areas of the image as excluded areas, wherein steps a) to d) are only performed in respect of areas of the image other than the excluded areas.

3. A method as claimed in claim 2, wherein groups of pixels each having a depth value greater than a predetermined threshold value are identified as said excluded areas.

4. A method as claimed in claim 1, further comprising the step e) of run-length coding the image depth data for the N discrete depth values.

5. A method as claimed in claim 1, comprising the further step, prior to step a), of quantising the depth values of the image to a predetermined number M of discrete depth values, where M>N.

6. A method as claimed in claim 5, wherein M equals 256 and N equals 16.

7. Image data processing apparatus comprising a first memory arranged to receive and store data defining a two-dimensional pixel image, and data defining a respective absolute depth value per pixel, the apparatus further comprising depth data processing and compression means arranged to process and compress the stored depth data of an image prior to transmission or storage of said depth data with the image data, characterised in that the depth data processing and compression means comprises:

a first comparison stage arranged to determine patches of adjoining pixels of the image, which pixels of a patch have the same or similar depth values to within a first predetermined range, and to amend the respective stored depth values to a common depth value for all pixels of the patch;

a second comparison stage arranged to group pixel patches having the same or similar common pixel depth values to within a second predetermined range, and to amend the respective stored depth values a common depth value for all pixels of patches so grouped;

area determination means arranged, for each discrete pixel depth value in the first memory, to determine the area of pixels in the image at that depth value and, for the smallest such area, to amend the respective stored depth value of each pixel of that area to the nearest existing discrete depth value; and counter means arranged to trigger repeated operation of the area determination means until only a predetermined number N of discrete depth values remain in the first memory.

8. Apparatus as claimed in claim 7, further comprising a first encoder triggered by the counter means determining that said N discrete depth values remain to generate a run-length coded representation of the depth data in the first memory.

9. Apparatus as claimed in claim 8, further comprising a second encoder arranged to compress the pixel image data according to a predetermined coding scheme, and interleaving means arranged to combine the outputs of the first and second encoders in an output data stream.

10. Apparatus as claimed in claim 9, wherein said predetermined coding scheme comprises discrete cosine transform coding in accordance with MPEG standards.

11. Apparatus as claimed in claim 9, comprising at least one further source of data and the interleaving means is further operable to combine said data from said at least one further source with the outputs of the first and second encoders in the output data stream.

12. Apparatus as claimed in claim 7, wherein the common depth value imposed on a patch by the first comparison stage is the greatest unamended depth value of any of the pixels in that patch.

13. Apparatus as claimed in claim 7, wherein the common depth value imposed on a patch by the first comparison stage is the smallest unamended depth value of any of the pixels in that patch.

14. Apparatus as claimed in claim 7, wherein the common depth value imposed on a group of patches by the second comparison stage is the greatest unamended depth value of any of the patches of that group.

15. Apparatus as claimed in claim 7, wherein the common depth value imposed on a group of patches by the second comparison stage is the smallest unamended depth value of any of the patches of that group.

* * * * *